United States Patent [19]

Antony et al.

[11] Patent Number: 4,981,197
[45] Date of Patent: Jan. 1, 1991

[54] MECHANICALLY ACTUATABLE SLIDING-CALIPER DISC BRAKE

[75] Inventors: Paul Antony; Bernd Rupprecht, both of Burstadt, Fed. Rep. of Germany

[73] Assignee: Deutsche Perrot-Bremse GmbH, Mannheim, Fed. Rep. of Germany

[21] Appl. No.: 344,384

[22] Filed: Apr. 28, 1989

[30] Foreign Application Priority Data

Apr. 28, 1988 [DE] Fed. Rep. of Germany ....... 3814475
Dec. 9, 1988 [DE] Fed. Rep. of Germany ....... 3814593

[51] Int. Cl.⁵ ..................... F16D 55/02; F16D 65/38
[52] U.S. Cl. ........................... 188/71.900; 188/196 D
[58] Field of Search ................... 188/72.4, 72.6, 72.7, 188/106 F, 196 D, 196 V, 203, 343, 370, 71.7, 71.9, 72.8, 72.9; 192/70.23, 111 A

[56] References Cited

U.S. PATENT DOCUMENTS 4,721,190 1/1988 Schmidt et al. ................ 188/196 D

FOREIGN PATENT DOCUMENTS 2330949 10/1982 Fed. Rep. of Germany .
3142799 5/1983 Fed. Rep. of Germany .

Primary Examiner—Robert J. Oberleitner
Attorney, Agent, or Firm—Fleit, Jacobson, Cohn, Price, Holman & Stern

[57] ABSTRACT

An automatic adjusting device for a mechanically acutated sliding-caliper disc brake has a mechanically actuated device for moving the sliding caliper relative to the brake disc comprising an oblique-track spreading device which has an actuating shaft, an adjusting nut coupled to the actuating shaft through a rotational ratchet mechanism which is operative when the actuating shaft is turned in the brake actuating direction, the rotational ratchet mechanism being formed as a positive-engagement saw-tooth ratchet having structural arrangements made so that when the actuating shaft exceeds a certain torque one section of the coupling yields axially against the force of a precompressed spring without transferring rotational movement to the adjusting nut.

10 Claims, 6 Drawing Sheets

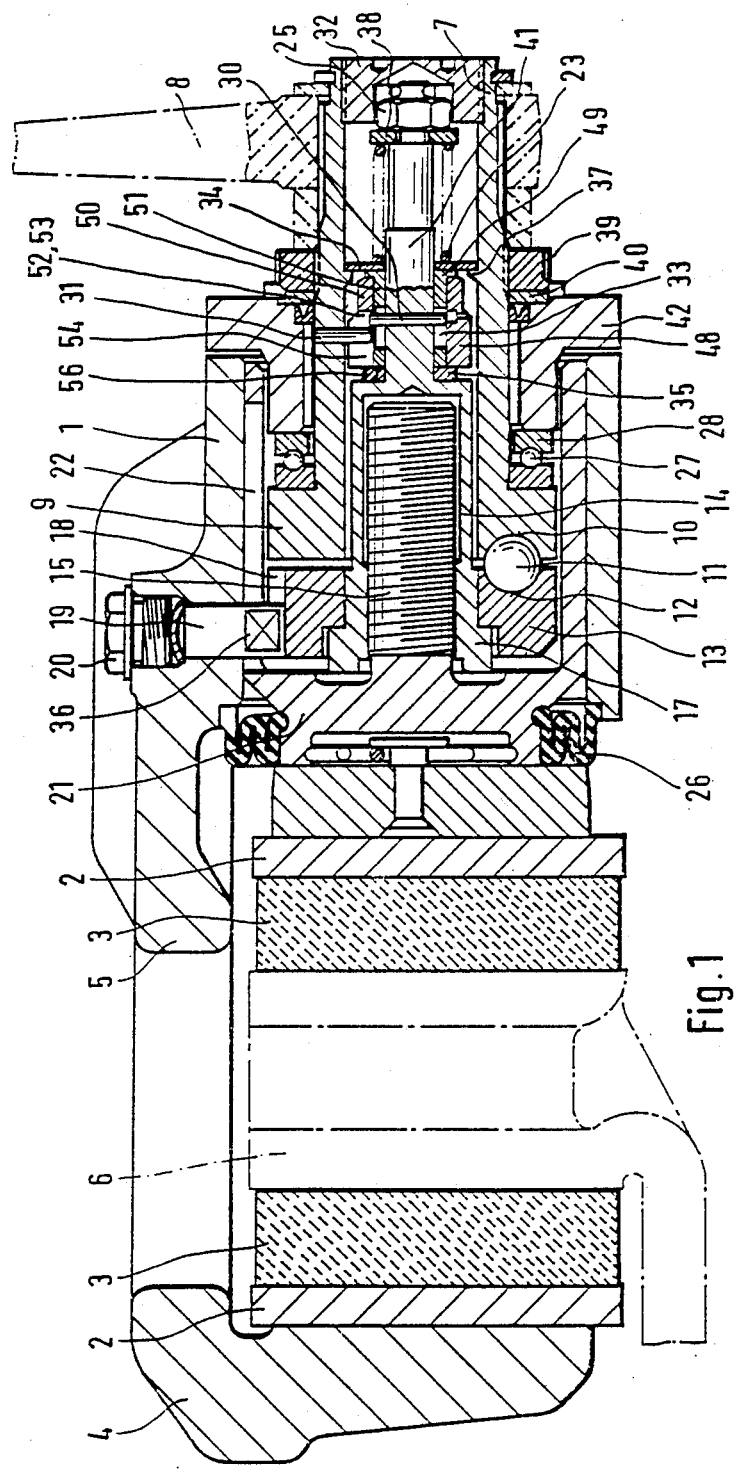

MECHANICALLY ACTUATABLE SLIDING-CALIPER DISC BRAKE

BACKGROUND OF THE INVENTION

This invention relates to a mechanically actuatable disc brake.

A disc brake is known from German patent specification DE-A No. 3 142 799 which includes a rotational ratchet mechanism which is operative when the actuating shaft is turned in the release direction. With this known disc brake the adjustment of the clearance therefore takes place during the brake release process. This principle is, however, not fully satisfactory as it is not possible to exclude unintentional adjustment of the clearance as a consequence of elastic deformation of the brake components, for example of the brake caliper, on the occurrence of very high braking moments. An incorrect adjustment of the clearance would, however, have the effect that after termination of the braking process unwanted frictional moments would appear between the brake disc and the brake linings and lead to severe heating of the entire brake unit. There is therefore a need for a disc brake in which unintentional adjustment of the clearance as a result of elastic deformation of the brake components can be excluded with certainty.

A sliding-caliper disc brake is also known from German Patent Specification No. DE-C 2 330 949 in which the adjustment of the clearance is carried out, not during the brake release process, but infinitely variably and as a function of the force during the actuation of the brake, arrangements being made to exclude any unintentional adjustment of the clearance as a consequence of the elastic deformation of the brake caliper occurring at very high braking moments. However, this known principle is only applicable to hydraulically actuated disc brakes.

BRIEF SUMMARY OF THE INVENTION

An object of this invention is to provide a disc brake which excludes, by structurally simple means, an excessively severe adjustment of the brake during the actuating stroke of the brake actuating device.

This object is accomplished in this invention by the provision of a rotational ratchet mechanism which is operative when the actuating shaft is turned in the actuating direction and which can yield axially when a certain torque is exceeded without turning the adjusting nut excluding any unintentional adjustment of the clearance. This has the effect that the section of the actuating path which is travelled when the brake is under load and which thus leads to an elastic deformation of the brake components is not taken into account or is not effective during the adjustment.

BRIEF DESCRIPTION OF THE DRAWINGS

An embodiment of the fundamental inventive concept which is especially advantageous from the structural aspect is and further exemplary embodiments of the invention are explained in greater detail below with reference to the accompanying drawing wherein:

FIG. 1 is a cross-sectional view through a sliding-caliper disc brake of the invention taken parallel to the longitudinal axis;

DETAILED DESCRIPTION

Figure 4:
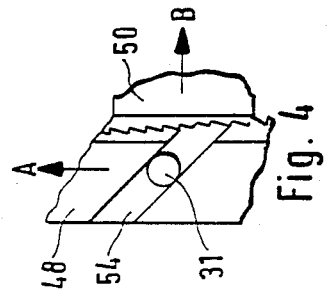
FIG. 4 is a tap plan view of a detail from FIGS. 2 and 3.
Figure 3:
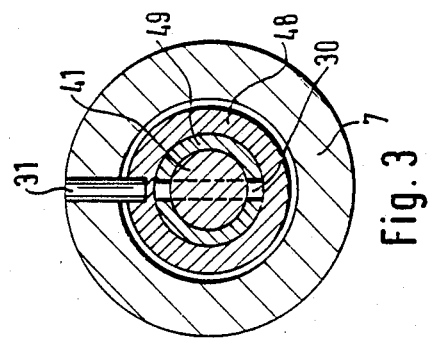
FIG. 3 is a cross-sectional view taken along line III—III in FIG. 2.
Figure 2:
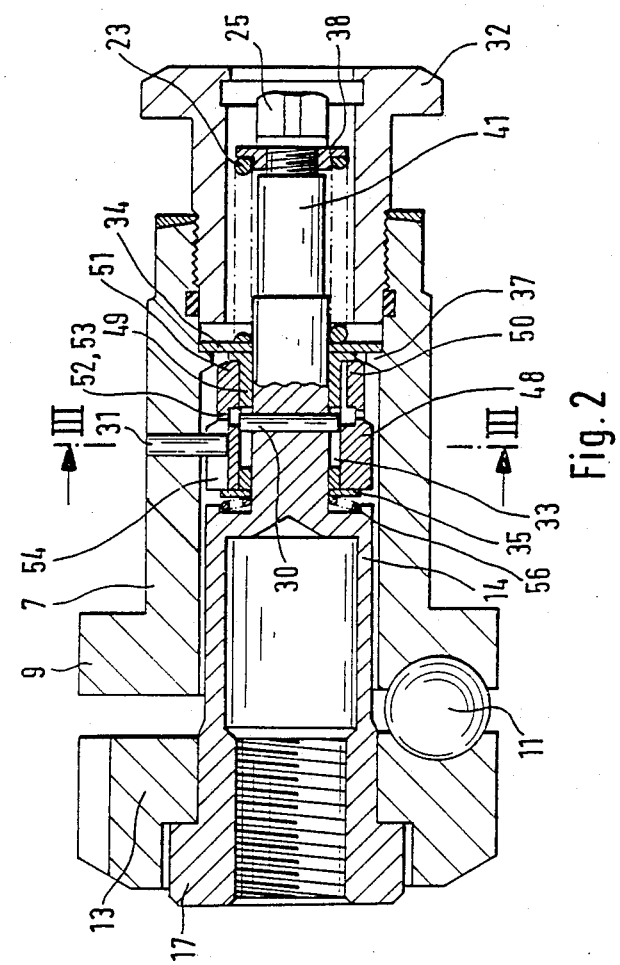
FIG. 2 is a larger scale cross-sectional view of a detail of the disc brake shown in FIG. 1 with the brake released.

As can be seen from FIG. 1 of the drawing the sliding-caliper disc brake illustrated includes a sliding-caliper 1 which, with its two half-calipers 4 and 5, overlaps the brake disc 6 indicated by a dash-dot line. The two half-calipers each has a brake lining mount 2 which carries a brake lining 3 facing towards the brake disc 6.

An actuating shaft 7 is mounted in the half-caliper 5 of the sliding-caliper 1 so that it can rotate. This actuating shaft which can be turned with a lever 8 terminates in a bushing-shaped end with a radially projecting shoulder 9. The side of this shoulder 9 facing away from the lever 8 is provided with at least two, preferably three oblique tracks 10 for taking balls 11 which on the other side run in corresponding oblique tracks 12 in a ring bearing 13. The corresponding oblique tracks 10 and 12 are located in the shoulder 9 and the ring bearing 13 in relation to one another in such a way that rotation of the actuating shaft 7 is converted into an axial movement of the ring bearing 13 and of an adjusting nut 14. Into this adjusting nut is screwed a pressure screw 15 which has a rotationally-positive connection to a piston 21 which carries the brake lining mount 2 and is secured against turning. To transfer axial forces from the ring bearing 13 to the adjusting nut 14 the latter is provided with a radially projecting shoulder 17 against which the ring bearing bears.

In order that the ring bearing 13 can move axially under the action of the actuating shaft 7 without participating in the turning of the actuating shaft 7 a rotation-prevention device is provided in the form of a guide slot 18 extending parallel to the axis in which is engaged a guide peg 19, with flats 36, passing through a slot 22 in the piston 21. This guide peg 19 is formed by the projecting end face of a threaded bolt 20 screwed into a radial threaded hole in the sliding caliper 1.

An annular packing 26 made of flexible synthetic material which extends between the sliding caliper 1 and the pistion 21 protects the actuating mechanism against penetrating foreign bodies, dirt and moisture.

On the reverse side of the shoulder 9 facing away from the oblique tracks 10 is provided an axial thrust bearing 27 by means of which the actuating shaft 7 bears against a ring bearing 28 which is seated against a flange 42.

The axial bearing 27 is set up without any play using an adjusting nut 39 which is screwed onto the actuating shaft 7 and bears against the flange 42 with a thrust washer 40.

The adjusting nut 14 has a rotationally-positive connection to an extension piece 41. A sleeve 49 is located on the extension piece 41 so that it can move axially and has axial slots 33 in which the two projecting ends of a pin 30 passing radially through the extension piece 41 are engaged without play. An adjusting sleeve 50 is located on the sleeve 49 with an interposed tolerance ring 51 so that there is a friction grip. An adjusting ring 48 is located on the end of sleeve 49 which is closer to the brake lining so that it can rotate. This adjusting ring 48 has on its circumference an oblique slot 54 in which a peg 31 protruding radially from the actuating shaft 7 is engaged without play. The end faces of the adjusting ring 48 and the adjusting sleeve 50 facing towards each other are provided with oblique serrations 52, 53. These sawtooth-shaped oblique serrations 52, 53 form a ratchet which is kept in engagement by the precompression force of a compression spring 56 which bears against the adjusting nut 14 and a washer 35 which is seated against the adjusting ring 48 and the sleeve 49. The flanks of the teeth of the two oblique serrations 52, 53 are directed so that they are positively engaged when the actuating shaft 7 is turned in the brake actuating direction and can slip over one another when the brake is released if there is an increased clearance. On the subsequent actuation of the brake the oblique serrations 52, 53 engage positively again and the adjustment step is accomplished. In this situation there is a stepwise adjustment of the clearance, the size of the clearance being determined by the tooth pitch.

A lock nut 25 is screwed onto the leading end of the extension piece 41. One end of a compression spring 23 bears against the lock nut 25 via a first washer 38 and the other end bears against a constriction 37 in the actuating shaft 7 via a second washer 34. This compression spring 23 seats the shoulder 17 of the adjusting nut 14 against the ring bearing 13 and thus keeps the spreading device 9, 10, 13 free from play at the ball guides 10, 12. This second washer 34 also serves as the seat for a radial shoulder on the sleeve 49. The compression spring therefore has a double function as it holds the oblique serrations 52, 53 of the adjusting ring 48 and of the adjusting sleeve 50 in engagement.

A threaded sealing plug 32 is screwed into the leading end of the actuating shaft 7 in order to protect the adjusting device against the penetration of dirt or water.

The disc brake described operates as follows:

When the actuating shaft 7 is turned by the lever 8 the balls 11 roll along the oblique tracks 10, 12 with the result that the ring bearing 13 moves towards the brake disc 6. The ring bearing 13 carries with it, by means of the shoulder 17, the adjusting nut 14 and the pressure screw 15 screwed into it which, by means of the piston 21, causes the brake lining 3 seated on the brake lining mount 2 to come into contact with the brake disc 6.

During the turning of the actuating shaft 7 its shoulder 9 bears, through the axial bearing 27 and the annular disc 28, against the flange 42 of the sliding caliper 1. As a result of the reaction force the sliding caliper 1 is displaced axially to the right in relation to the brake disc 6 until finally the brake lining 2 on the brake lining mount 3 positioned on the half-caliper 4 comes into contact with the brake disc 6.

When, during the braking process as shown in FIG. 4, the actuating shaft 7 is moved in the direction of the arrow A then its peg 31, which is engaged without play in the oblique slot 54 in the adjusting ring 48, turns the unit consisting of the adjusting ring 48, the adjusting sleeve 50, the tolerance ring 51 and the sleeve 49 through the engaged ratchet 52, 53. The second washer 34 is seated against the radial shoulder of the sleeve 49 and against the constriction 37 in the actuating shaft 7 by the precompression force of the compression spring 23. The frictional moment between the shoulder 17 of the adjusting nut 14 and the ring bearing 13 is overcome by the claw coupling formed by the axial slots 33 in the sleeve 49 and by the pin 30 passing through the extension piece 41, and the adjusting nut 14 is turned in the adjusting direction on the pressure screw 15. This adjusts the clearance.

As soon as the brake linings 3 are in contact with the brake disc 6 there is a considerable increase in the friction between the shoulder 17 of the adjusting nut 14 and the ring bearing 13 resulting from the tightening force and thus in the moment required to turn the adjusting nut 14. However, this also increases the axial component B of the force exerted by the peg 31 on the oblique slot 54 in the adjusting ring 48 which eventually exceeds the precompression force of the compression spring 23. When the actuating shaft 7 is turned further in the actuating direction then the adjusting nut 14 is held by the sharply increasing frictional moment at the ring bearing 13, and the adjusting ring 48 presses the unit consisting of the adjusting sleeve 50, the tolerance ring 51 and the sleeve 49 away from the constriction 37 in the actuating shaft 7 against the precompression force of the compression spring 23.

The section of the actuating path travelled when the brake is under load, which leads to an elastic deformation of the brake components, is thus not taken into account during the adjustment because the rotary movement of the peg 31 is converted into an axial movement of the sleeve 49.

When the brake is released the precompression force of the compression spring 23 presses the unit 49, 51, 50, 48 back axially until second washer 34 engages against the constriction 37 in the actuating shaft 7 and, and as a consequence of the release movement of the actuating shaft 7, the peg 31 turns the adjusting ring 48 to its original position, and its oblique serrations 52 slip over one or more teeth of the oblique serrations 53 in the adjusting sleeve 50 corresponding to the wear in the brake linings 3.

The release process, which becomes necessary when renewing the brake linings 3 and for a new basic adjustment, is extremely simple. First, the screwed sealing plug 32 is removed, and then a box spanner is placed on the lock nut 25 in order to turn the extension piece 41 and thus the adjusting nut 14. Depending on the direction of rotation of the lock nut 25 the pressure screw 15 is screwed out of the adjusting nut 14 or is screwed into it. In principle, the adjusting sleeve 50 is in engagement, via the oblique serrations 52, 53, with the adjusting ring 48 which has a rotationally-positive connection with the actuating shaft 7 through the peg 31. It follows that the adjusting sleeve 50 cannot be turned independently of the actuating shaft 7. However, the adjustment process is not hindered by this circumstance because the static friction of the tolerance ring 51 can easily be overcome by the torque exerted by the box spanner on the lock nut 25.

Figure 5:
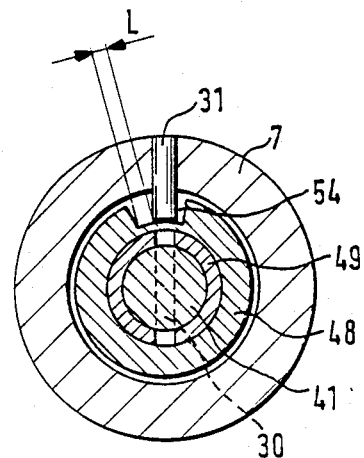
FIG. 5 is an enlarged view similar to that in FIG. 3 through a modified embodiment.

As has been mentioned previously, the clearance can be given different values through differing tooth pitches of the ratchet 52, 53. Another possibility shown in FIG. 5 is to increase the width of the oblique slot 54 in the adjusting ring 48 while retaining the diameter of the peg 31, which results in a clearance "L".

Figure 6:
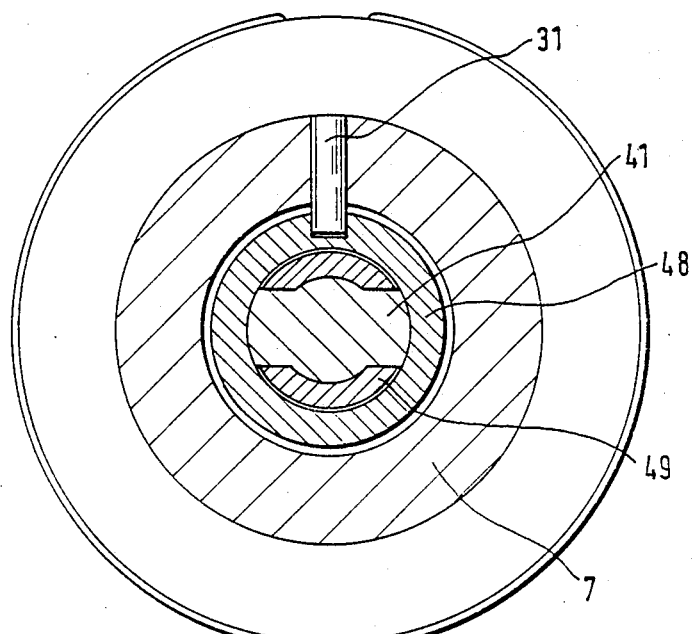
FIG. 6 is an enlarged view similar to that in FIG. 3 through yet another embodiment.
Figure 7:
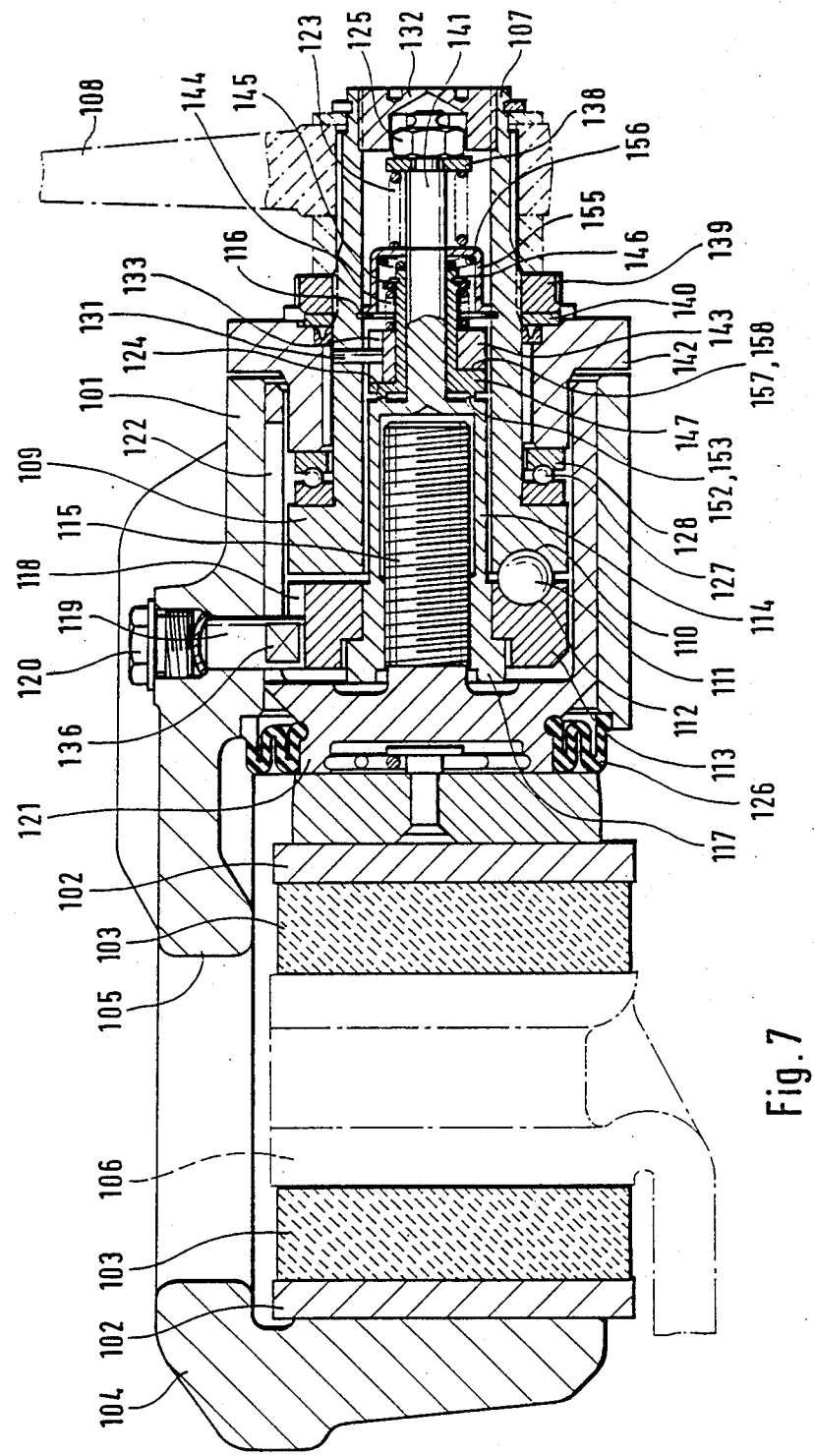
FIG. 7 is a view similar to FIG. 1 of a different embodiment of a sliding-caliper disc brake in accordance with the invention.
Figure 8:
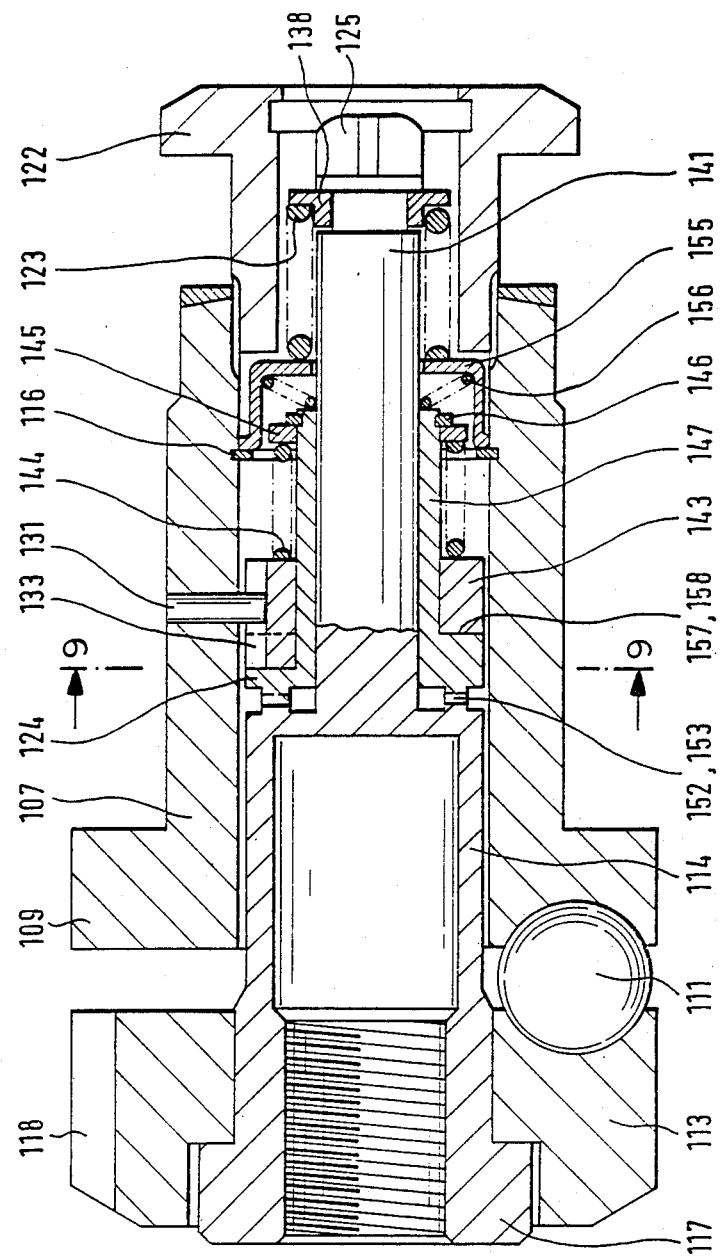
FIG. 8 is a view similar to FIG. 2 on a larger scale of a detail of the disc brake shown in FIG. 7 with the brake released.
Figure 9:
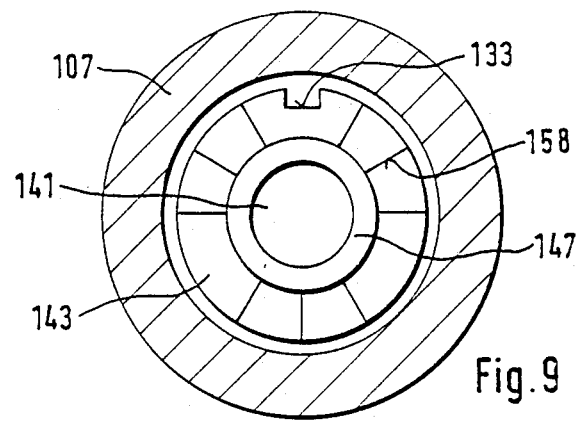
FIG. 9 is a cross-sectional view taken along line IX—IX in FIG. 8.

The coupling between the sleeve 49 and the extension piece 41 can also be formed in the manner shown in FIG. 6. In this case the sleeve 49' is formed as a claw sleeve which is engaged in the axial slots of the extension piece 41' in such a way that it can move but not rotate.

FIGS. 7 to 11 of the drawings represent a sliding-caliper disc brake which requires fewer individual parts for the adjusting means than the embodiment described previously. As the construction of this sliding-caliper disc brake corresponds basically to the embodiment shown in FIGS. 1 to 6, reference should be made to the previous designs. Corresponding components are given the same reference symbols, but in each case the number 100 has been added.

In the embodiment of the adjusting means shown in FIGS. 7 to 11 the extension piece 141 has a smaller diameter than the adjusting nut 114 so that a face is formed. This face of the adjusting nut 114 is provided with oblique serrations 152. An adjusting bushing 147 is mounted on the extension piece 141 of the adjusting nut 114 so that it can rotate and move axially. This adjusting bushing 147 has a shoulder 124 of which the face facing towards brake disc is also provided with oblique serrations 153. These sawtooth-shaped serrations 152, 153 form a ratchet which is kept in engagement by the precompression force of a compression spring 156 which in turn bears against a radially inward projecting flange of a spring collar 155. A radially outward projecting projection of the spring collar 155 is seated under the precompression force of a compression spring 123 against a retaining ring 116 mounted in the actuating shaft 107. A ring 143 is mounted on the adjusting bushing 147 so that it can rotate and move axially. This ring 143 is pressed against the shoulder 124 of the adjusting bush 147 by the precompression force of a compression spring 144 bearing against a washer 145 and a retaining ring 146 located on the adjusting bushing 147. The ring 143 has an axial slot 133 in which a peg 131 of the actuating shaft 107 is engaged either without play (see FIG. 10) or with a basic clearance (see FIG. 11). In this way the brake clearance can be determined both by the tooth pitch of the ratchet 152, 153 and also additionally by the dimension L between the peg 131 and the wall of the axial slot 133 (see FIG. 11).

The faces of the shoulder 124 of the adjusting bushing 147 and of the ring 143 which face towards one another form a coupling which, when the brake is actuated, transfer the actuating moments produced to the adjusting nut 114 only up to a certain upper limit. This coupling is made so that in the face of the shoulder 124 are formed at least three depressions running radially outward in the form of inclined ramps 157 which in section have triangular profiles, and so that three complementary projections in the form of inclined ramps 158, which are formed on the corresponding face of the ring 143, are engaged in these depressions 157. Naturally, the arrangement of the depressions and the projections could also be interchanged. As the retaining ring 146 is fixed on the adjusting bushing 147 the parts forming the coupling, consisting of the ring 143 and the adjusting bush 147, are pressed against one another due to the precompression force of the compression spring 144 bearing against the said retaining ring 146.

A lock nut 125 is screwed onto the leading end of the extension piece 141 of the adjusting nut 114. One end of the compression spring 123 bears against the lock nut 125 by way of a washer 138 and the other end bears against the spring collar 155. A threaded sealing plug 132 is screwed into the leading end of the actuating shaft 107 in order to protect the adjusting means against the penetration of dirt or water.

Figure 10:
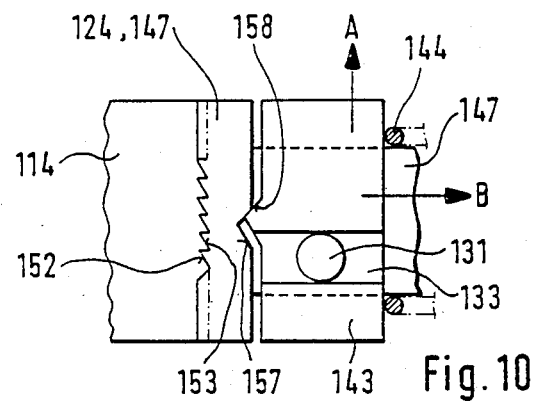
FIG. 10 is a top plan view of a detail from FIG. 8 with the brake released.
Figure 11:
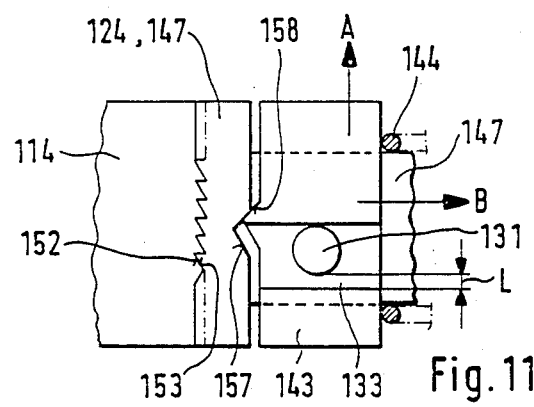
FIG. 11 is a view similar to that in FIG. 10 which shows a modified embodiment.

The adjusting means described operates as follows:
When, during a braking process as shown in FIG. 10, the actuating shaft 107 is moved in the direction of arrow A then its peg 131 engaged in the axial slot 133 in the ring 143 turns the ring 143. The ring 143 transmits, through the inclined ramps 157, 158 forming the coupling, a rotational movement to the adjusting bushing 147 which is in engagement with the adjusting nut 114 via the ratchet 152, 153 under the precompression force of the compression spring 156. The friction moment, which is produced between the shoulder 117 of the adjusting nut 114 and the ring bearing 113 by the precompression force of the compression spring 123, is overcome by the coupling between the ring 143 and the adjusting bushing 147 with the result that the adjusting nut 114 is turned in the adjusting direction on the pressure screw 115. This adjusts the clearance.

As soon as the brake linings 103 are in contact with the brake disc 106 there is a considerable increase in the friction, resulting from the tightening force, between the shoulder 117 of the adjusting nut 114 and the ring bearing 113 and in the screwed connection between the pressure screw 115 and the adjusting nut 114, and thus in the torque required to turn the adjusting nut 114. When the actuating shaft 107 is turning further in the actuating direction A the adjusting nut 114 is held by the sharply increasing frictional moment at the ring bearing 113, and the ring 143 slides on the adjusting bushing 147 over the inclined ramps 157, 158 in the direction of the arrow B against the precompression force of the compression spring 144 so that the static friction in the coupling is overcome and it is separated.

The section of the actuating path travelled when the brake is under load, which leads to an elastic deformation of the brake components, is thus not taken into account during the adjustment because the coupling is separated by the further rotational movement of the actuating shaft 107.

When the brake is released the ring 143 is turned by the peg 131 so that, as a result of the precompression force of the compression spring 144, the coupling comes back into engagement through the inclined ramps 157, 158. The precompression forces of the compression spring 123 on the adjusting nut 114 and of the compression spring 144 on the coupling are larger than the precompression force of the compression spring 156 holding the ratchet 152, 153 in engagement. If, through lining wear, the actuating shaft 107 is turned beyond the clearance of the tooth pitch then the oblique serrations 153 on the adjusting bush 147 which is turned with it through the coupling skips one or more teeth of the oblique serrations 152 on the adjusting nut 114. The new clearance adjustment then takes place during the subsequent brake actuation.

When the brake linings are replaced the piston 121 can be brought to its original position by turning back the adjusting nut 114 at the lock nut 125, during which process the coupling 157, 158 slides through or, for opposite rotational movement, the ratchet 152, 153 skips.

We claim:

1. In a mechanically actuated disc brake having a sliding caliper mounted so that it can move transversely to a brake disc, two half-calipers, brake lining mounts and brake linings thereon engageable with the brake disc, an actuating shaft having a longitudinal axis and rotatably mounted in one of the half-calipers and having a bushing shaped end with a radially projecting shoulder, first oblique tracks on one side face of the shoulder, a ring bearing having second oblique tracks facing in opposing relationship the first oblique tracks, ball members in rolling engagement in the tracks for transforming rotary motion of the actuating shaft into axial movement of the ring bearing, a pressure screw rotationally connected to one brake lining mount, the actuating shaft secured against axial movement by having the side of the projecting shoulder facing away from the first oblique track bearing, via an axial thrust bearing, against the sliding caliper, the ring bearing being movable axially in relation to the brake caliper but secured against rotation relative to the brake caliper and bearing against a sleeve-shaped adjusting nut having an internal screw thread into which the pressure screw is screwed and an extension piece extending coaxially through the actuating shaft, an adjusting ring rotatably movably mounted on the extension piece of the adjusting nut, a radial peg in one of the actuating shaft and adjusting ring slidably engaging in a slot in the other of the actuating shaft and adjusting ring, an adjusting sleeve non-rotatably mounted on the extension piece, oblique serrations on faces of the adjusting ring and the adjusting sleeve facing towards one another forming a rotational ratchet mechanism, and a spring component bearing on the adjusting nut and on the adjusting ring for maintaining the two oblique serrations in engagement, the improvement wherein:

the adjusting sleeve and adjusting ring are mounted on the extension piece for axial movement with respect thereto;

compression spring means are provided on the extension piece for resiliently urging the adjusting sleeve axially against the adjusting ring; and the slot extends substantially obliquely relative to the longitudinal axis of the actuating shaft at an angle so that when the actuating shaft is turned in the direction for actuating the brake, the rotational ratchet mechanism is operated and force exerted by the radial peg on the adjusting sleeve has an axial component directed against the adjusting sleeve sufficient to overcome the force of said compression spring means when a predetermined braking force is exceeded and the adjusting ring and adjusting sleeve move axially instead of rotationally relative to the extension piece.

2. A disc brake as claimed in claim 1 and further comprising:

a constriction means on the actuating shaft; and a washer on the extension piece, said compression spring urging said washer against said constriction means;

the adjusting sleeve being urged in the direction of said washer opposite to the force of the compression spring.

3. A disc brake as claimed in claim 2 and further comprising:

a sleeve member non-rotatably and axially movably mounted on the extension piece, the adjusting sleeve being mounted on said sleeve member; and slip coupling means between said adjusting sleeve and said sleeve member for transmitting a predetermined limited torque between said adjusting sleeve and sleeve member.

4. A disc brake as claimed in claim 3 wherein:

said slip coupling means comprises a tolerance ring interposed between said adjusting sleeve and sleeve member.

5. A disc brake as claimed in claim 4 and further comprising:

a plurality of axially extending slots in said sleeve member; and a pin member extending radially through the extension piece and having ends thereon projecting outwardly from the extension piece into said slots in said sleeve member to prevent relative rotation and allow relative axial movement between said sleeve member and said extension piece.

6. A disc brake as claimed in claim 3 and further comprising:

a plurality of axially extending slots in said sleeve member; and a pin member extending radially through the extension piece and having ends thereon projecting outwardly from the extension piece into said slots in said sleeve member to prevent relative rotation and allow relative axial movement between said sleeve member and said extension piece.

7. A disc brake as claimed in claim 1 and further comprising:

a sleeve member non-rotatably and axially movably mounted on the extension piece, the adjusting sleeve being mounted on said sleeve member; and slip coupling means between said adjusting sleeve and said sleeve member for transmitting a predetermined limited torque between said adjusting sleeve and sleeve member.

8. A disc brake as claimed in claim 7 wherein: said slip coupling means comprises a tolerance ring interposed between said adjusting sleeve and sleeve member.

9. A disc brake as claimed in claim 8 and further comprising:

a plurality of axially extending slots in said sleeve member; and a pin member extending radially through the extension piece and having ends thereon projecting outwardly from the extension piece into said slots in said sleeve member to prevent relative rotation and allow relative axial movement between said sleeve member and said extension piece.

10. A disc brake as claimed in claim 7 and further comprising:

a plurality of axially extending slots in said sleeve member; and a pin member extending radially through the extension piece and having ends thereon projecting outwardly from the extension piece into said slots in said sleeve member to prevent relative rotation and allow relative axial movement between said sleeve member and said extension piece.

* * * * *

UNITED STATES PATENT AND TRADEMARK OFFICE
CERTIFICATE OF CORRECTION

PATENT NO. : 4,981,197

DATED : January 1, 1991

INVENTOR(S) : Paul ANTONY et al

It is certified that error appears in the above-identified patent and that said Letters Patent is hereby corrected as shown below:

On title page

Item [75] should read "Paul Antony of Bürstadt and Bernd Rupprecht of Edingen-Neckarhausen 2"

Item [30] should read "Apr. 28, 1988 (DE) Fed. Rep. of Germany...3814475 and Dec. 9, 1988 (DE) Fed. Rep. of Germany...3841593"

Signed and Sealed this

Twentieth Day of October, 1992

*Attest:*

DOUGLAS B. COMER

*Attesting Officer*      *Acting Commissioner of Patents and Trademarks*